(12) United States Patent
Zheng et al.

(10) Patent No.: US 8,910,937 B2
(45) Date of Patent: Dec. 16, 2014

(54) SHEET MEDIUM DETECTION DEVICE AND SHEET MEDIUM PROCESSING DEVICE

(75) Inventors: Lei Zheng, Shandong (CN); Tianxin Jiang, Shandong (CN); Min Yang, Shandong (CN); Yang Liu, Shandong (CN)

(73) Assignee: Shandong New Beiyang Information Technology Co., Ltd. (CN)

( * ) Notice: Subject to any disclaimer, the term of this patent is extended or adjusted under 35 U.S.C. 154(b) by 0 days.

(21) Appl. No.: 13/993,951

(22) PCT Filed: Nov. 18, 2011

(86) PCT No.: PCT/CN2011/082476
§ 371 (c)(1),
(2), (4) Date: Jun. 13, 2013

(87) PCT Pub. No.: WO2012/079442
PCT Pub. Date: Jun. 21, 2012

(65) Prior Publication Data
US 2013/0264770 A1 Oct. 10, 2013

(30) Foreign Application Priority Data
Dec. 16, 2010 (CN) .......................... 2010 1 0594606

(51) Int. Cl.
*B65H 7/02* (2006.01)
*B65H 7/14* (2006.01)
*G01B 11/00* (2006.01)
*G01B 11/02* (2006.01)
*G01B 11/04* (2006.01)

(52) U.S. Cl.
CPC *B65H 7/14* (2013.01); *G01B 11/00* (2013.01); *G01B 11/028* (2013.01); *G01B 11/043* (2013.01); *B65H 2553/412* (2013.01); *B65H 2553/44* (2013.01); *B65H 2801/06* (2013.01)
USPC ..................................... 271/265.01; 271/245

(58) Field of Classification Search
USPC ............................................ 271/245, 265.01
See application file for complete search history.

(56) References Cited

U.S. PATENT DOCUMENTS

| 7,635,123 B2 * | 12/2009 | Watanabe et al. ............ 271/9.09 |
| 2009/0190070 A1 * | 7/2009 | Nagata et al. ................... 349/65 |

(Continued)

FOREIGN PATENT DOCUMENTS

| CN | 1426570 | 6/2003 |
| CN | 1612073 | 5/2005 |

(Continued)

OTHER PUBLICATIONS

International Search Report for International Patent Application No. PCT/CN2011/082476, mailed Feb. 23, 2012.

*Primary Examiner* — Michael McCullough
*Assistant Examiner* — Howard Sanders
(74) *Attorney, Agent, or Firm* — McAndrews, Held & Malloy, Ltd.

(57) ABSTRACT

The present invention provides a sheet medium detection device, which comprises a light guide bar (2) provided on one side of a medium conveying passage (4) and provided with a plurality of reflection surfaces (21) arranged with Intervals along a length direction of the light guide bar, wherein each of the reflection surfaces (21) reflects the light within the light guide bar (2) to the other side of the medium conveying passage (4); a plurality of light receivers (31), each of which, being opposite to a reflection surface (21) of the light guide bar, is provided on the other side of the medium conveying passage (4); and a point light source (1) provided at least on one end of the light guide bar along the length direction of the light guide bar, wherein each of the reflection surfaces (21) is provided obliquely to form an obtuse angle relative to the light guide bar (2) on the side where the point light source (1) locates. The present invention also provides a sheet medium processing device which comprises the detection device described above. The sheet medium detection device has a low cost and high adaptability.

9 Claims, 4 Drawing Sheets

(56) References Cited

U.S. PATENT DOCUMENTS

2010/0002461 A1* 1/2010 Wu et al. .................. 362/558
2011/0058366 A1* 3/2011 Lin et al. ............. 362/217.05

FOREIGN PATENT DOCUMENTS

| | | |
|---|---|---|
| CN | 1892468 | 1/2007 |
| CN | 102122000 | 7/2011 |
| JP | 200397910 | 4/2003 |

* cited by examiner

SHEET MEDIUM DETECTION DEVICE AND SHEET MEDIUM PROCESSING DEVICE

This application claims the priority of Chinese patent application with application No. 201010594606.4, titled as "sheet medium detection device and sheet medium processing device", and filed on Dec. 16, 2010, and all disclosed contents thereof should be incorporated herein by reference.

TECHNICAL FIELD OF THE INVENTION

The present invention relates to a sheet medium detection device and a sheet medium processing device using the sheet medium detection device.

BACKGROUND OF THE INVENTION

Sheet medium processing device, such as printer, scanner and currency validators, performs processing such as printing, scanning and identification when a medium moves along a medium conveying passage. In order to adapt to as many medium types as possible, the width of the medium conveying passage is generally set according to the maximum width of the medium. For example, the printer used in a bank needs to print various types of mediums such as bank book, deposit receipt and transaction log, in which the width of the bank book is the smallest and the width of the medium for printing the transaction log is the biggest, wherein the width of the medium for printing the transaction log is at least twice the width of the bankbook. In order to satisfy the printing of the bankbook, the deposit receipt and the transaction log simultaneously, the width of the medium conveying passage of the printer is adapted to the width of the medium for printing the transaction log. Since the width of the medium conveying passage is far greater than the minimum width of medium, it is needed to arrange a medium detection device in the medium conveying passage to detect the position and state of the medium in the medium conveying passage.

There are two types of common medium detection mechanisms in the art.

The first type is to arrange a set of light detector at a fixed position of the medium conveying passage. Generally, the light detector comprises a light receiver and a light emitter which are provided on two sides of the medium conveying passage correspondingly; and medium can pass through between the light receiver and the light emitter. If there is no medium passing between the light receiver and the light emitter, the light beam emitted by the light emitter almost is fully received by the light receiver, then the light receiver outputs a first electrical signal. If there is a medium passing through between the light receiver and the light emitter, the medium blocks the light beam emitted from the light emitter to the light receiver so that the light receiver can not receive the light beam, then the light receiver outputs a second electrical signal. Thus, by detecting the change of the electrical signal output by the light receiver, it can be judged whether there is a medium passing through the fixed position. The defect of this scheme lies in that the medium must be input to the medium conveying passage from a position provided with the medium detection device; otherwise, the medium can not be detected; therefore, the flexibility of operation is low.

The other type of medium detection device is as shown in FIG. 1; multiple sets of light detectors are aligned and provided in the medium conveying passage perpendicular to a medium conveying direction. Each set of light detector comprises a light receiver 10 and a light emitter 10' which are provided oppositely with a preset distance, and the medium can pass through between the light receiver 10 and the light emitter 10'. Similar to the first type of medium detection device, the position and the state of the medium are determined by detecting the change of the electrical signal output by the light receiver. The advantage of this scheme lies in that the medium detection device can detect the position and the state of medium no matter where the medium is input from in the passage; therefore, the operation is relatively flexible. However, since the light emitter is a key part of the medium detection device and this scheme needs to arrange a plurality of light emitters, the cost of the device is high.

SUMMARY OF THE INVENTION

The purpose of the present invention is to provide a sheet medium detection device which has a low cost, and a sheet medium processing device using the detection device.

According to one aspect of the present invention, a sheet medium detection device is provided, comprising: a light guide bar provided on one side of a medium conveying passage and provided with a plurality of reflection surfaces arranged with Intervals along a length direction of the light guide bar, wherein each of the reflection surfaces reflects the light within the light guide bar to the other side of the medium conveying passage; a plurality of light receivers, each of which, being opposite to a reflection surface of the light guide bar, is provided on the other side of the medium conveying passage; and a point light source provided at least on one end of the light guide bar along the length direction of the light guide bar, wherein each of the reflection surfaces is provided obliquely to form an obtuse angle relative to the light guide bar on the side where the point light source locates.

Further, two ends of the light guide bar are provided with the point light source respectively; correspondingly, each of the reflection surfaces is provided obliquely to form an obtuse angle relative to the light guide bar on the adjacent side where the point light source side locates.

Further, the reflection surface and the light guide bar on the side where the point light source side locates form an included angle of 120~150°.

Further, the reflection surface is formed by a cutting groove inside the light guide bar; and the start point of the cutting groove is located at the side of the light guide bar far from the medium conveying passage.

Further, the depth of the cutting groove corresponding to each of the reflection surfaces is increased with the increase of the distance from each of the reflection surfaces to the point light source.

Further, the length of the light guide bar is adapted to the width of the medium conveying passage.

Further, one end of the light guide bar facing the point light source is provided with a concave pit which forms a concave curved surface.

Further, the light guide bar consists of a plurality of short light guide bars; and the reflection surface is formed by the joint surface of two adjacent short light guide bars.

Further, the length of the reflection surface is increased with the increase of the distance from the reflection surface to the point light source.

According to another aspect of the present invention, a sheet medium processing device comprises a medium conveying mechanism, a medium processing mechanism which are provided along a medium conveying passage, and further comprising at least one sheet medium detection device described above.

Further, one sheet medium detection device of the at least one sheet medium detection device is located at the entrance of the medium conveying passage for detecting the existence of a medium.

Further, the sheet medium processing device further comprises an alignment stopper provided on the medium conveying passage for aligning the medium, wherein one sheet medium detection device of the at least one sheet medium detection device is located at the upstream of the alignment stopper to detect whether the medium is aligned.

In the present invention, by arranging reflection surfaces in the light guide bar opposite to each of the light receivers to convert the point light source at one end of the light guide bar into a plurality of linear light sources to reflect to the light receiver, it is not necessary to arrange a plurality of light emitters. The position and the state of the medium in the medium conveying passage can be detected at any position of the medium conveying passage, and the device has a low cost and high adaptability.

Besides purposes, features and advantages described above, the present invention also has other purposes, features and advantages. Other purposes, features and advantages of the present invention will be further described in details below as shown in drawings.

BRIEF DESCRIPTION OF THE DRAWINGS

Drawings, which form a part of the description and are provided for further understanding of the present invention, show the preferred embodiments of the present invention, and explain the principle of the present invention together with the description. In the drawings.

Figure 1:
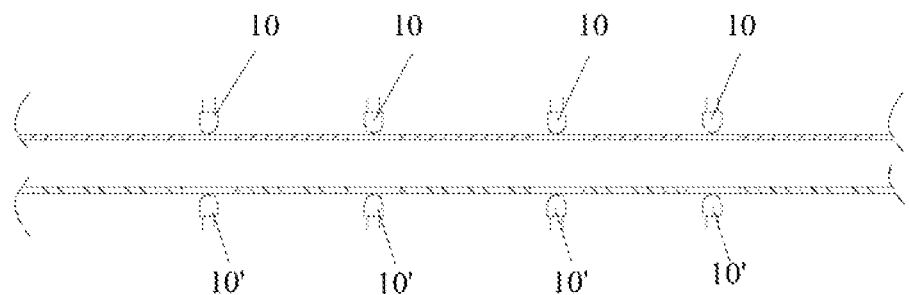
FIG. 1 shows a diagram of a medium detection device in the prior art.

Marks in the accompanying drawings are described below:
1—point light source;
2—light guide bar;
3—light receiving module;
4—medium conveying passage;
21—reflection surface;
22—reception surface;
23—concave pit;
31—light receiver;
211, 211'—first group of reflection surfaces;
212, 212'—second group of refection surfaces;
11—first medium detection device;
12—first conveying roller set;
121—first driving roller;
122—first driven roller;
13—second medium detection device;
14—alignment stopper;
15—medium processing mechanism;
151—print head;
152—platen;
16—second conveying roller set.

DETAILED DESCRIPTION OF THE EMBODIMENTS

The embodiments of the present invention will be described in detail below as shown in drawings, however the present invention may be implemented by various different ways defined and covered by the claims. In the drawings, identical components are indicated by identical reference number.

Figure 2:
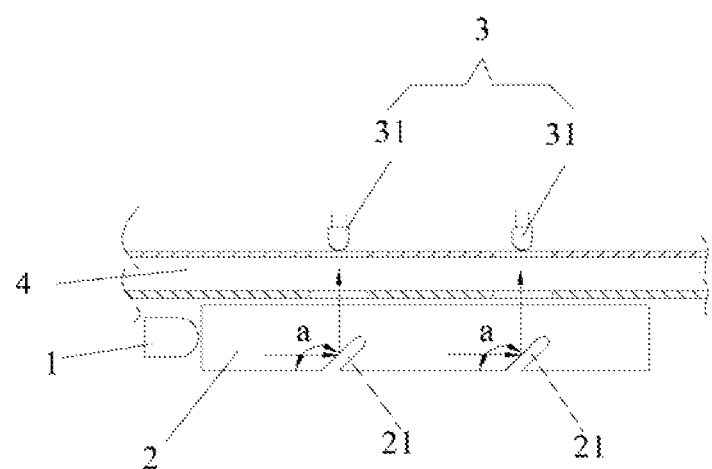
FIG. 2 shows a diagram of a medium detection device according to a first embodiment of the present invention.

FIG. 2 shows a diagram of a medium detection device according to a first embodiment of the present invention. As shown in FIG. 2, the medium detection device comprises a point light source 1, a light guide bar 2 and a light receiving module 3. The light guide bar 2 and the light receiving module 3 are provided on two sides of a medium conveying passage 4 respectively. The light guide bar 2 and the light receiving module 3 are provided oppositely with a preset distance, and a medium can pass through between the light guide bar 2 and the light receiving module 3 during the conveying process.

The light guide bar 2 is a cuboid or a cylinder made of a transparent material, the length direction of which is parallel to a plane on which the medium conveying passage 4 is located. At least one end of the light guide bar 2 along a length direction of the light guide bar 2 is provided with a point light source 1, wherein the point light source 1 can be in a shape of spheroid, hemispheroid or cylinder. The light guide bar 2 converts the light emitted by the point light source 1 into a linear light source perpendicular to the plane on which the medium conveying passage 4 is located. The light receiving module 3 comprises at least two light receivers 31, wherein each of the light receivers 31 are arranged with preset Intervals and aligned along the length direction of the light guide bar 2 and face the light guide bar 2.

A reflection surface 21 is provided in the light guide bar 2 corresponding to each light receiver 31, wherein the reflection surface 21 is provided obliquely to form an obtuse angle relative to the light guide bar on the point light source 1 side correspondingly. That is, the included angel a between one side of the reflection surface 21 facing the point light source 1 and the plane on which the medium conveying passage 4 is located is an obtuse angle. Preferably, the included angel a is between 120 degrees and 150 degrees. The reflection surface 21 reflects the light emitted by the point light source 1 to the corresponding light receiver 31.

In this embodiment, the point light source 1 is provided at one end of the light guide bar 2, the light receiving module 3 comprises two light receivers 31, and the included angel between one side of the reflection surface 21 facing the point light source 1 and the plane on which the medium conveying passage 4 is located is 135 degrees. Thus, the light radiated on the reflection surface 31 is intensively reflected along a direction perpendicular to the plane on which the medium conveying passage 4 is located.

Since each light receiver 31 corresponds to a reflection surface 21, each light receiver 31 can receive sufficient light in the condition of no obstruct. In this way, if there is no medium passing through between the light receiver 31 and the corresponding reflection surface 21, the light receiver 31 receives the light of high intensity; thus, the light receiver 31 outputs a first electrical signal, such as high voltage. If there is a medium passing through between the light receiver 31 and the corresponding reflection surface 21, the medium blocks the light beam reflected by the reflection surface 21 to the light receiver 31 so that the light receiver 31 can not receive the light thus, the light receiver 31 outputs a second electrical signal, such as low voltage.

Since the intensity of the light received by the light receiver 31 has a big difference between the condition in which the medium exists and the condition in which the medium does not exist, that is, there is a big difference between the first electrical signal and the second electrical signal, so it can be determined whether the position where the light receiver 31 is located has a medium by detecting the electrical signal output by the light receiver 31; thus, the position and the state of the medium in the passage can be accurately determined according to the position of the light receiver 31 relative to the medium conveying passage.

It should be noted that the reflection surface 21 can be formed by cutting the light guide bar 2 transversely, and the cutting point is located on the side of the light guide bar 21 far from the medium conveying passage. In addition, the light guide bar 2 can consist of a plurality of short light guide bars connected by one by one, and the reflection surface 21 can be formed by the joint surface of two adjacent short light guide bars.

It should be noted that the light guide bar can be arranged along the width direction of the medium conveying passage, or along conveying direction of the medium.

In the medium detection device provided by the present invention, by arranging reflection surfaces in the light guide bar corresponding to each light receiver to convert the point light source at one end of the light guide bar into a plurality of linear light sources to reflect to the light receiver, it is not necessary to arrange a plurality of light emitters. The position and the state of the medium in the medium conveying passage can be detected; thus, the cost of the device is reduced. Particularly, when the light guide bar is arranged along the width direction of the medium conveying passage, the position and the state of the medium in the medium conveying passage can be detected at any position of the medium conveying passage; thus, convenience of operation is improved.

Figure 3:
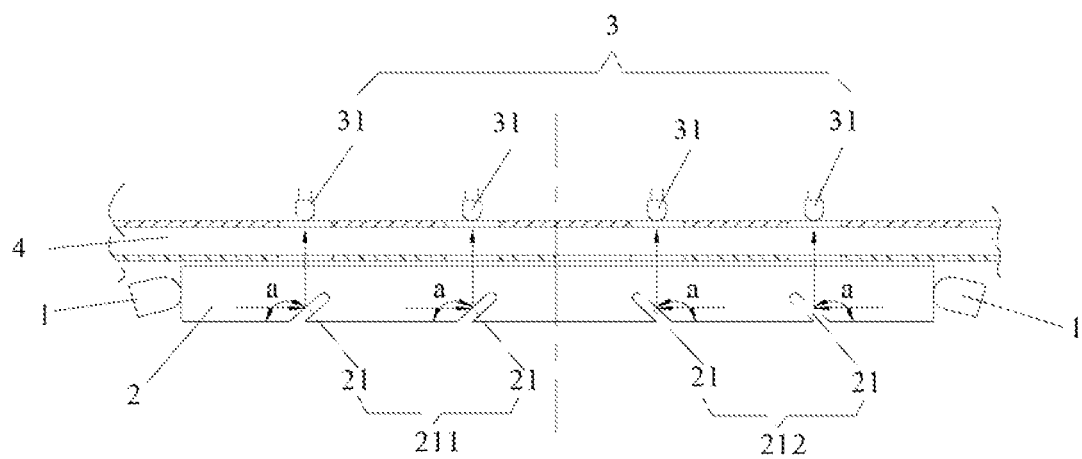
FIG. 3 shows a diagram of a medium detection device according to a second embodiment of the present invention.

FIG. 3 shows a diagram of a medium detection device according to a second embodiment of the present invention. The difference between this embodiment and the embodiment above lies in that both two ends of the light guide bar 2 are provided with a point light source 1, wherein the arranging direction of the reflection surface 21 is adapted to the position of the light point source 1.

Specifically, each of the two ends of the light guide bar 2 along its length direction is provided with a point light source 1 respectively. The light receiving module 3 comprises four light receivers 31, wherein each of the two light receivers 31 are aligned and spaced by a preset distance along the length direction of the light guide bar 2 and face the light guide bar 2. In the light guide bar 2, each of reflection surfaces 21 is provided corresponding to a light receiver 31; thus, there are totally four reflection surfaces 21 in the light guide bar 2.

With the centre along the length of the light guide bar 2 as a boundary, the four reflection surfaces 21 are divided into two groups. The first group of reflection surfaces 211 is matched with the point light source 1 on the left end of the light guide bar 2 to reflect the light emitted by the point light source 1 nearer to the reflection surface 21 to the corresponding light receiver 31; the second group of reflection surfaces 212 is matched with the point light source 1 on the right end of the light guide bar 2 to reflect the light emitted by the point light source 1 nearer to the reflection surface 21 to the corresponding light receiver 31; meanwhile, the included angel a between one side of the reflection surface 21 facing the point light source 1 and the plane on which the medium conveying passage 4 is located is an obtuse angle.

In this embodiment, by arranging a point light source 1 at each ends of the light guide bar 2 respectively, the reflection surface 21 reflects the light emitted by the point light source 1 nearer to the reflection surface 21 to the corresponding light receiver 31. Even though the light guide bar 2 is relatively longer, the problem that the light emitted by the reflection surface 21 far from the point light source 1 is insufficient is avoided; thus, the reliability of the medium detection device is higher.

Figure 4:
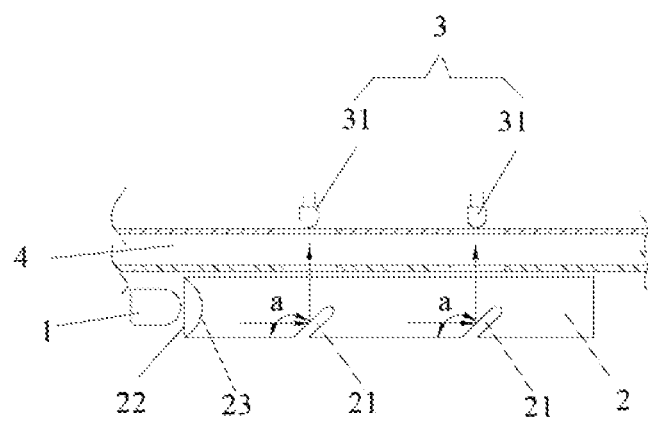
FIG. 4 shows a diagram of a medium detection device according to a third embodiment of the present invention.

FIG. 4 shows a diagram of a medium detection device according to a third embodiment of the present invention. The difference between this embodiment and the first embodiment lies in that a reception surface 22 of the light guide bar 2 facing the point light source 1 is provided with a concave pit 23 facing the point light source 1. The concave pit 23 forms a concave curved surface, wherein this concave pit can increase the amount of incident light and reduce the loss of light.

Figure 5:
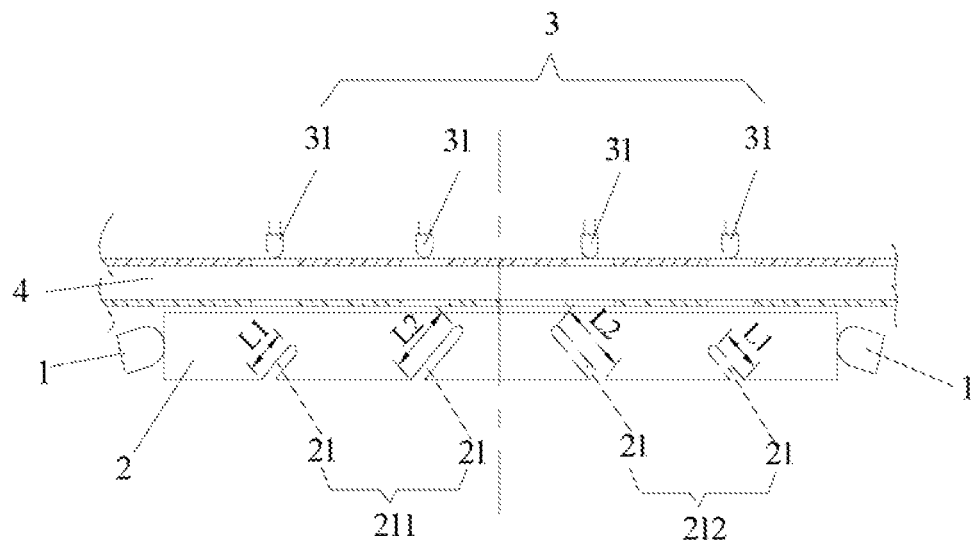
FIG. 5 shows a diagram of a medium detection device according to a fourth embodiment of the present invention.

FIG. 5 shows a diagram of a medium detection device according to a fourth embodiment of the present invention. The difference between this embodiment and the second embodiment lies in that the length of the reflection surface is in positive proportion to the distance between this reflection surface and the adjacent point light source 1. That is to say, the farther the reflection surface 21 is from the point light source 1, the longer the reflection surface is. Correspondingly, the length of the cutting groove forming the reflection surface is increased with the increase of the distance between the reflection surface 21 and the point light source 1. In FIG. 5, L2 is greater than L1. Thus, the problem that the reflection surface nearer to the point light source 1 weakens the reflected brightness of the reflection surface farther from the point light source 1 is solved.

Figure 6:
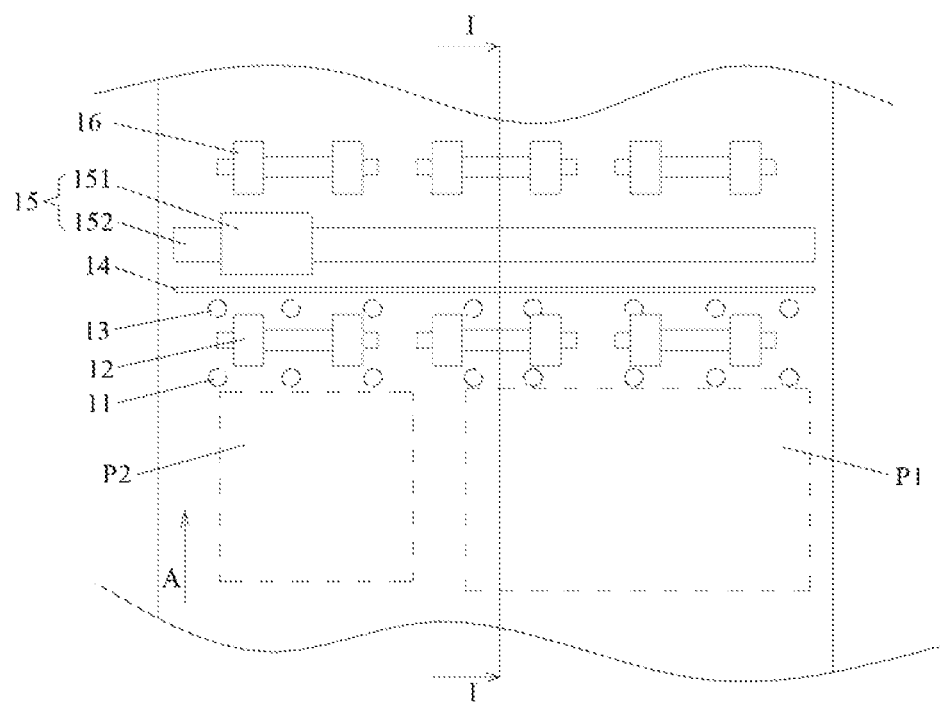
FIG. 6 shows a top view of a sheet medium processing device having a medium detection device according to the present invention.
Figure 7:
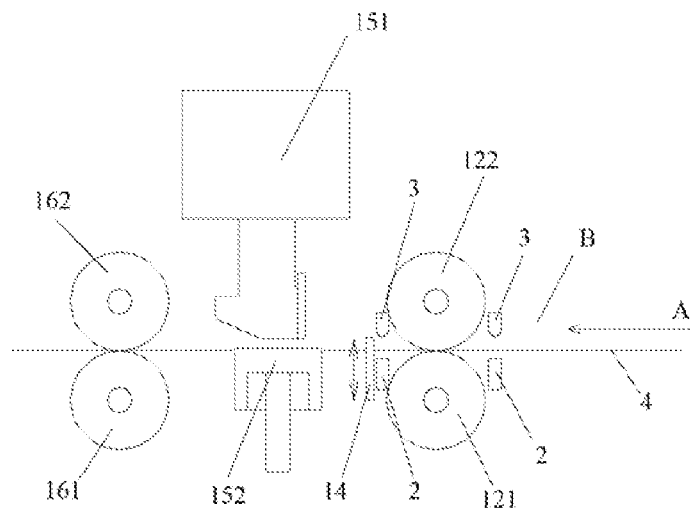
FIG. 7 shows a sectional view of the sheet medium processing device shown in FIG. 6 along direction.
Figure 8:
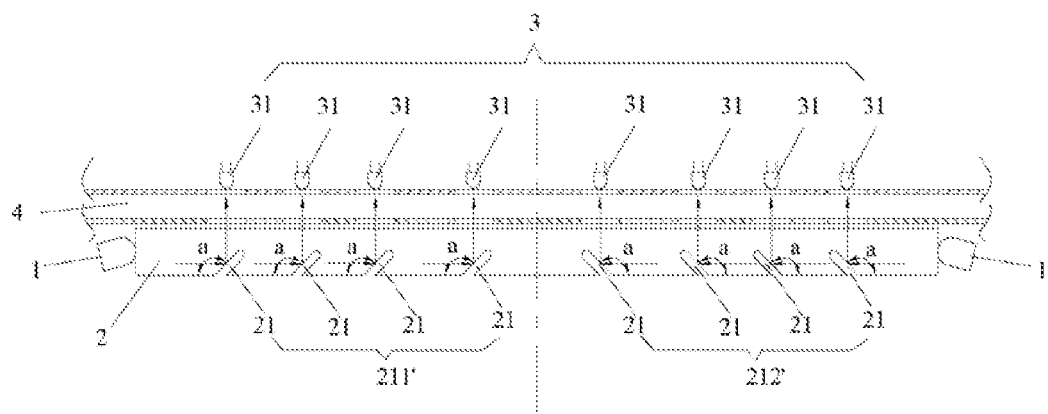
FIG. 8 shows a diagram of the first medium detection device shown in FIG. 6.

FIG. 6 shows a top view of a sheet medium processing device having a medium detection device according to the present invention; FIG. 7 shows a sectional view of the sheet medium processing device shown in FIG. 6 along direction; FIG. 8 shows a diagram of the first medium detection device shown in FIG. 6. Hereinafter, the sheet medium processing device according to the present invention is described in conjunction with FIG. 6 to FIG. 8.

As shown in FIG. 6 to FIG. 8, the sheet medium processing device comprises a first medium detection device 11, a first conveying roller set 12, a second medium detection device 13, an alignment stopper 14, a medium processing mechanism 15 and a second conveying roller set 16 which are provided along a medium input direction A. The first medium detection device 11 is configured to detect whether there is a medium at the entrance B of the sheet medium processing device; the first conveying roller 12 and the second conveying roller 16 are configured to convey the medium to move in the medium conveying passage 4; the second medium detection device 13 is configured to detect whether the front end of the medium is aligned to the alignment stopper 14; the medium processing mechanism 15 is configured to process the medium, wherein the medium processing mechanism 15 can be a printing mechanism, a scanning mechanism, a read-write magnetic mechanism and the like. The width L of the medium conveying passage 4 is greater than those of the first type of medium P1 and the second type of medium P2.

The first medium detection device 11 is located at the entrance B of the medium processing device, comprising a point light source 1, a light guide bar 2 and a light receiving module 3. The light guide bar 2 and the light receiving module 3 are provided on two sides of the medium conveying passage 4 respectively, facing each other with a preset distance, wherein the medium can pass through between the light guide bar 2 and the light receiving module 3 during the conveying process. The light guide bar 2 is a cuboid or a cylinder made of a transparent material, of which the length direction is parallel to a plane on which the medium conveying passage 4 is located and is perpendicular to the medium input direction A; the length of the light guide bar 2 is adapted to the width of the medium conveying passage 4. Each of the two ends of the light guide bar 2 along its length direction is provided with a point light source 1 respectively, wherein the light guide bar 2 converts the light emitted by the point light source 1 into a linear light source which is then emitted out perpendicular to the plane on which the medium conveying passage 4 is located.

The light receiving module 3 comprises eight light receivers 31, each two light receivers 31 of which are aligned and spaced by a preset distance along the length direction of the light guide bar and the light receivers 31 face the light guide bar 2. In the light guide bar 2, each reflection surfaces 21 are provided corresponding to a light receiver 31; therefore, there are totally eight reflection surfaces 21 in the light guide bar. With the centre of the light guide bar 2 along the length as a boundary, the eight reflection surfaces 21 are divided into two groups, wherein the first group of reflection surfaces 211' is matched with the point light source 1 on the left end of the light guide bar 2 to reflect the light emitted by the point light source 1 nearer to the reflection surface 21 to the corresponding light receiver 31; the second group of reflection surfaces 212' is matched with the point light source 1 on the right end of the light guide bar 2 to reflect the light emitted by the point light source 1 nearer to the reflection surface 21 to the corresponding light receiver 31. Meanwhile, the included angel a between one side of the reflection surface 21 facing the point light source and the plane on which the medium conveying passage 4 is located is an obtuse angle.

The first conveying roller set 12 is located at the downstream of the first medium detection device 11 along the medium input direction A, including a first driving roller 121 and a first driven roller 122 which provided oppositely and tangentally. When a medium passes through between the first driving roller 121 and the first driven roller 122, under the driving of the first driving roller 121, the medium can be input to or output from the sheet medium processing device along the medium conveying passage.

The second medium detection device 13 is located at the downstream of the first conveying roller set 12 to detect whether the front end of the medium is aligned to the alignment stopper 14. Since the second medium detection device 13 is totally the same as the first medium detection device 11, no further description is needed here.

The alignment stopper 14 is located at the downstream of the second medium detection device 13 and has a preset distance spaced from the second medium detection device 13. The alignment stopper 14 is provided perpendicular to the plane on which the medium conveying passage 4 is located and perpendicular to the medium input direction A, thus the alignment stopper 14 is parallel to the light guide bar 2 of the second medium detection device 13. The alignment stopper 14 can move along a direction perpendicular to the plane on which the medium conveying passage 4 is located to enter or leave the medium conveying passage, so as to close or open the medium conveying passage.

The medium processing mechanism 15 is located at the downstream of the alignment stopper 14, and the medium processing mechanism 15 can be one or a combination of more of printing mechanism, scanning mechanism, read-write magnetic processing and other processing mechanisms.

In this embodiment, the medium processing mechanism 15 is a printing mechanism, including a print head 151 and a platen 152. The platen 152 is provided parallel to the plane on which the medium conveying passage is located and perpendicular to the medium input direction A. The print head 151 is provided opposite to the platen 152 and can move along the extension direction of the platen. When a medium passes through between the print head 151 and the platen 152, the print head 151 injects the ink on a ink ribbon (not shown in the figures) onto the medium so as to form images or texts on the medium.

The second conveying roller set 16 is located at the downstream of the printing mechanism, including a second driving roller 161 and a second driven roller 162 which are provided oppositely and tangentally. When the printed medium passes through between the second driving roller 161 and the second driven roller 162, under the driving of the second driving roller 161, the medium can be input to or output from the sheet medium, processing device along the medium conveying passage.

The working principle of the sheet medium processing device is briefly described below. Since the width of the medium conveying passage is greater than that of medium, the medium might be deflected while being conveying in the medium conveying passage. In order to avoid incorrect processing position (such as printing position, scanning position, read-write magnetic position) of medium caused by the deflection of medium, the working process of the sheet medium processing device is divided into an alignment phase and a processing phase.

In the alignment phase, the alignment stopper 14 is inserted into the medium conveying passage 4 to close the medium conveying passage, thus medium can not enter the medium processing mechanism 15. Therefore, the front end of the medium is aligned to the alignment stopper 14 during the conveying process. In the processing phase, the alignment stopper 14 leaves the medium conveying passage 4 to open the medium conveying passage 4; thus, the aligned medium moves towards the medium processing mechanism 15 to be processed. The control device judges whether the medium enters the alignment phase according to an output signal of the first medium detection device 11 and judges whether the medium enters the processing phase according to an output signal of the second medium detection device 13.

When the medium enters the sheet medium processing device from the entrance B, no matter which position the medium P1 or P2 enters from, only if any one light receiver 31 in the first medium detection device 11 outputs a second electrical signal, the control device of the sheet medium processing device judges that there is a medium at the entrance B, thus controlling the first conveying roller set 12 to drive the medium to the sheet medium processing device to move towards the alignment stopper 14, then the sheet medium processing device enters the alignment phase.

When at least two light receivers 31 in the second medium detection device 13 output a second electrical signal, it is indicated that the medium corresponds to at least two light receivers 31. For a straight line is determined according to two points, the control device judges that the medium is aligned to the alignment stopper 14, thus the alignment stopper 14 is controlled to leave the medium conveying passage 4 and the first conveying roller set 12 is controlled to drive the medium towards the medium processing mechanism 15, then the sheet medium processing device enters the processing phase and executes medium processing. After the medium is processed, the control device controls the second conveying roller set 16 to output the medium from the sheet medium processing device.

According to the sheet medium processing device having the medium detection device provided by the present invention, it is not necessary to provide a plurality of point light sources. The existence position and the existence state of the medium in the medium conveying passage can be detected in the medium conveying passage, and the alignment state of the medium can be detected too. Therefore, the cost of the device is reduced. Particularly, when the light guide bar is provided along the width of the medium conveying passage, the position and the state of the medium in the medium conveying passage can be detected at any position of the medium conveying passage, thus convenience of operation is improved.

Above contents only describe the preferred embodiments of the present invention and are not intended to limit the present invention; for one skilled in the art, the present invention may have various modifications and changes. Any modifications, equivalent replacements and improvements made within the spirit and principle of the present invention should be included within the protection scope of the present invention.

The invention claimed is:

1. A sheet medium detection device, comprising:
    a light guide bar provided on one side of a medium conveying passage and provided with a plurality of reflection surfaces arranged with intervals along a length direction of the light guide bar, wherein each of the reflection surfaces reflects the light within the light guide bar to the other side of the medium conveying passage;
    a plurality of light receivers, each of which, being opposite to a reflection surface of the light guide bar, is provided on the other side of the medium conveying passage; and
    a point light source;
    wherein two ends of the light guide bar are provided with the point light source respectively;
    the reflection surface is formed by a cutting groove inside the light guide bar;
    the start point of the cutting groove is located at the side of the light guide bar far from the medium conveying passage, the end point of the cutting groove is located inside the light guide bar;
    a distance between the end point and the point light source corresponding to the end point is greater than a distance between the start point and the point light source corresponding to the start point, so that an angle from a side of the point light source directly facing the reflection surface to the plane of the medium conveying passage is an obtuse angle.

2. The sheet medium detection device according to claim 1, wherein the reflection surface and the light guide bar on the side where the point light source locates form an included angle of 120~150°.

3. The sheet medium detection device according to claim 1, wherein the depth of the cutting groove corresponding to each of the reflection surfaces is increased with the increase of the distance from each of the reflection surfaces to the point light source.

4. The sheet medium detection device according to claim 1, wherein the length of the light guide bar is adapted to the width of the medium conveying passage.

5. The sheet medium detection device according to claim 1, wherein one end of the light guide bar facing the point light source is provided with a concave pit which forms a concave curved surface.

6. The sheet medium detection device according to claim 1, wherein the length of the reflection surface is increased with the increase of the distance from the reflection surface to the point light source.

7. A sheet medium processing device, comprising a medium conveying mechanism and a medium processing mechanism which are provided along a medium conveying passage, and further comprising at least one sheet medium detection device according to claim 1.

8. The sheet medium processing device according to claim 7, wherein one sheet medium detection device of the at least one sheet medium detection device is located at the entrance of the medium conveying passage for detecting the existence of a medium.

9. The sheet medium processing device according to claim 7, further comprising an alignment stopper provided on the medium conveying passage for aligning the medium, wherein one sheet medium detection device of the at least one sheet medium detection device is located at the upstream of the alignment stopper to detect whether the medium is aligned.

* * * * *